May 4, 1965
R. TENCONI
3,181,940
DEVICE FOR FORMING THE SHAPED REINFORCED PARTS OF
STOCKINGS ON CIRCULAR MACHINES FOR THE
MANUFACTURE OF STOCKINGS OR SOCKS
Filed Sept. 13, 1961
4 Sheets-Sheet 2
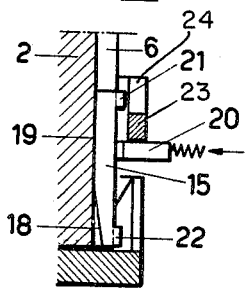
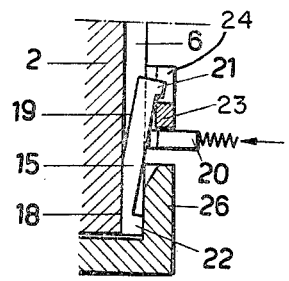
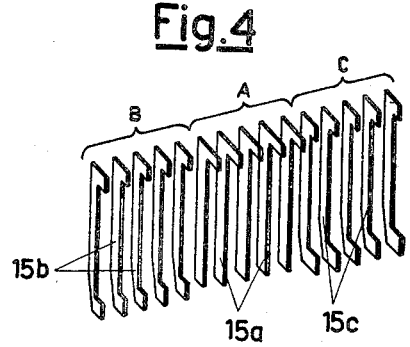
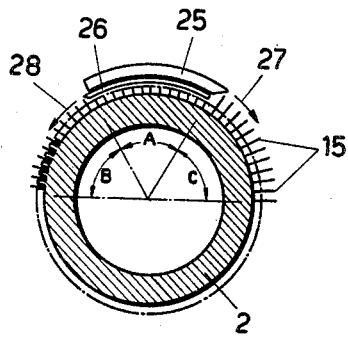

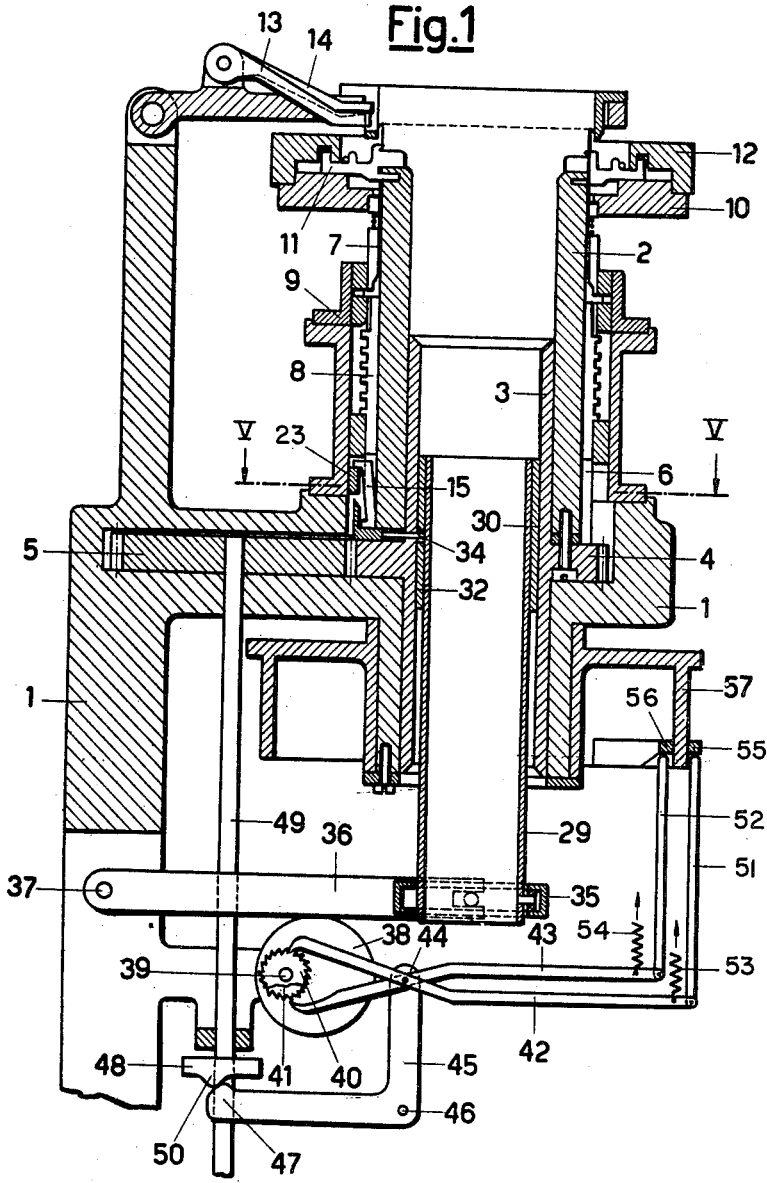

May 4, 1965 R. TENCONI 3,181,940
DEVICE FOR FORMING THE SHAPED REINFORCED PARTS OF
STOCKINGS ON CIRCULAR MACHINES FOR THE
MANUFACTURE OF STOCKINGS OR SOCKS
Filed Sept. 13, 1961 4 Sheets-Sheet 4

United States Patent Office 3,181,940
Patented May 4, 1965

3,181,940
DEVICE FOR FORMING THE SHAPED REINFORCED PARTS OF STOCKINGS ON CIRCULAR MACHINES FOR THE MANUFACTURE OF STOCKINGS OR SOCKS
Riccardo Tenconi, Varese, Italy, assignor to Marcella Sessa Moretta, Varese, Italy
Filed Sept. 13, 1961, Ser. No. 137,887
Claims priority, application Italy, Sept. 13, 1960, 15,924/60, Patent 636,624
15 Claims. (Cl. 66—49)

The present invention relates to circular knitting machines for the manufacture of stockings and socks, and is particularly directed to the provision of a device for the formation of shaped reinforced parts of stockings or socks.

It is known that certain parts of stockings and socks, particularly, for example, the heel, the toe and, on occasion, the sole, are often strengthened by adding an extra thread to the normal thread at the parts to be strengthened. Said strengthened parts may have varying shapes. There are several possible arrangements by which the addition of supplementary thread to the normal thread may be achieved, and among these are the following:

(a) One arrangement consists in suitably controlling the thread guides for the supplementary thread so that, at the required instants, they are shifted from an inoperative position where the related thread cannot be taken by the hooks of the needles, into an operative position where the needles can grip the supplementary thread as well as the regular thread, in order to knit it into the fabric.

It is apparent that, in the above described arrangement, for every feed with which the machine is provided, there must be provided a supplementary thread guide, and that all these thread guides are controlled by a centralized device in the machine through appropriate mechanical transmission means. This arrangement has the disadvantage of being not very precise in that it is, in practice, extremely difficult to bring a thread guide from the inoperative position into the operative position at the exact moment at which a precisely determined needle of the needle cylinder passes in front of such guide, the difficulty being due not only to unavoidable play in the mechanical linkage but also to the considerable number of needles and the high rotational speed of the cylinder in modern circular knitting machines for the manufacture of stockings. It follows that the shape of the reinforced part of the stocking may not correspond exactly to the desired pattern, which constitutes, especially in women's stockings, a serious fault in the appearance of the stocking.

(b) In another arrangement for introducing the supplementary thread, the thread guides for the latter are held at rest, while the needles are selectively controlled to grip the supplementary thread as well as the regular thread when desired.

From the standpoint of precision in selection, and hence in shaping of the reinforced part, this arrangement is much better than the first, and in order to provide it, it is sufficient simply to use one of the several patterning devices already existing on modern circular knitting machines for the manufacture of stockings and socks.

However, it should be noted that the possibilities for the use of such patterning devices for making the shaped reinforced parts are extremely limited for the following reasons. In the first place it would be necessary to use very long pushers arranged below the needles in the slots of the drum, with a large number of heels provided at different heights on said pushers, in order to make possible the achievement of a certain range of patterns or shapes for the reinforced parts. Moreover, such especially shaped pushers cannot be used for the knitting of types of fabric for which they are not particularly designed.

This means that it would be necessary to provide, besides the normal pushers, supplementary pushers to be used exclusively for selecting the needles when making the reinforced parts. Because of their length, the supplementary pushers would considerably increase the height of the needle drum and hence that of the whole machine, which has already reached a height that should not be exceeded.

It should also be noted that, on modern circular knitting machines, the tendency is progressively to increase the number of feeds in order to increase the output from the machine. Whereas machines with one or at most two feeds were most common machines built with four feeds are now in use. This means that the controls for selecting the needles that have to be provided for one feed, must be repeated with equal exactness and precision for all the other feeds. For this purpose it would be necessary to fit each feed with a complete patterning device of its own in order to obtain the desired selection of the needles for all the feeds, and this would involve enormous design complications and make the structure of the machine, which is already sufficiently complex in itself, even more complex.

The present invention has as its object to provide a device for the formation of the shaped reinforced parts on stockings and socks produced on circular knitting machines, which device reliably achieves absolute precision in the making of the shaped parts without complicating the structure of the machine to any great extent, while avoiding complex linkages and the need to increase the height of the machine, and yet enabling a wide range of shapes to be made.

The device according to the present invention is, generally speaking, of the second type described above, that is, one in which the supplementary thread is added to the normal thread in the knitting of the reinforced parts by the selective control of the needles, with the thread guides being kept generally stationary.

The main characteristic of the device to which the present invention relates consists in the fact that the means for selecting those needles which are raised to also grip the supplementary thread are rotatable with the needle cylinder and are actuated preferably from the inside of said cylinder instead of from a point on the machine that is fixed in relation to the revolving cylinder.

The control means are designed for selecting at will a certain number of needles on the drum or cylinder by means of lifters placed below the needles and, where pushers are provided, below the latter in the slots of the needle drum, so that the selected needles can be lifted higher than the remaining needles by means of a fixed cam associated with each of the feeds with which the machine is provided, so as to grip the supplementary thread, as well as the normal thread, brought to the needles by thread guides of each feed.

Since the control means are rotatable with the needle drum, it is manifest that there can be a single control system for whatever number of feeds the machine is provided with, and this results in considerable simplification with respect to known systems, especially if the device is applied to a machine with multiple feeds, and makes the selection of the needles easier and more precise.

The above, and other objects, features and advantages of the invention, will be apparent in the following detailed description of illustrative embodiments thereof which is to be read in connection with the accompanying drawings forming a part hereof, and wherein:

FIG. 1 is a vertical sectional view taken through the axis of the needle drum of a conventional circular knitting machine for the manufacture of stockings and socks and incorporating a device according to a first embodiment of this invention;

FIGS. 2 and 3 are enlarged, fragmentary sectional views of a portion of the drum, and with a lifter being shown in its inoperative and operative positions, respectively;

FIG. 4 is a diagrammatic perspective view of a set of lifters;

FIG. 5 is a transverse sectional view taken along the line V—V on FIG. 1;

Figure 6:
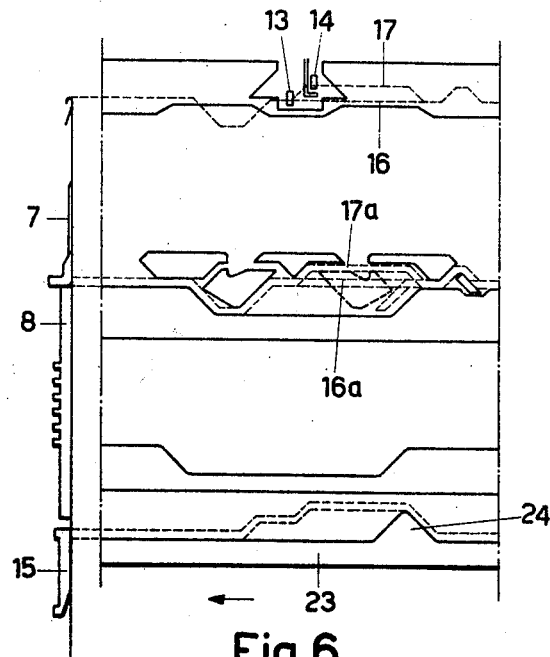
FIG. 6 is a diagram showing the configuration of the cams for controlling the needles and operating the lifters.

The drawings illustrate, and the following detailed description will specifically mention, only those parts of the circular knitting machine that are indispensable for the ready comprehension of the device according to the invention. It is to be understood that all the parts of the knitting machine that are not illustrated or not described in detail, can be made in any known manner.

Furthermore, it should be observed that, in order to simplify the description and to facilitate understanding of the operation of the device embodying the invention, said device will be illustrated and described as applied to a circular knitting machine for the manufacture of commonly known types of stockings, and which has a single feed.

It should be understood, however, that the device can be applied in an identical manner to machines with any number of feeds, and indeed—as already stated—in the latter case the advantages offered by the invention will become even more evident.

Referring in particular to FIG. 1, it will be seen that the illustrated circular knitting machine includes a frame 1 wherein there is rotatably supported the needle drum or cylinder 2 which is secured on a tube 3 carrying integrally therewith a gear 4 in mesh with a second gear 5 which receives its continuous or reciprocating motion from a motor. Needles 7 are disposed in the longitudinal slots 6 of needle drum 2, and pushers 8 are disposed in the slots 6 below the needles and are actuated in a conventional manner in order to cause the cams of the fixed cam box 9 to move the needles upwardly and downwardly in thin slots 6.

At the top of drum 2 there is fixed a ring 10 provided with radial slits slidably reclining sinkers 11 controlled by fixed cams arranged in the cover 12.

The parts briefly described above are well known and common to circular knitting machines for the manufacture of stockings and socks.

The device according to the invention for the formation of reinforced and shaped parts, comprises, in the embodiment illustrated in FIGS. 1 to 7, lifters 15 placed below pushers 8 in the slots 6 of drum 2. As may be seen in FIG. 5, the lifters 15 are provided for only half of the needles 7, that is, for the needles arranged around half of the circumference of the drum. Since the reinforced shaped parts to be formed with the aid of the device embodying the invention are always situated in one half of the stocking, it is sufficient to provide lifters for half of the needles. There is nothing, however, to prevent the device, and hence said lifters, from being provided for all the needles of the drum.

Lifters 15 are designed to selectively raise their corresponding needles 7 by a certain amount more than that necessary to cause the needles to grip the normal thread fed by a thread guide 13 (FIG. 6). A supplementary thread guide 14 is provided before said normal thread guide 13 (in the direction of rotation of drum 2), for the purpose of feeding the reinforcing thread. This supplementary thread guide 14 is, however, placed higher than the normal thread guide 13, and therefore the needles 7 that are lifted by the normal cams of the cam box 9 (FIG. 1), and thus have their hooks and heels moved along the paths indicated by the broken lines 16 and 16a, respectively, on FIG. 6, are not able to grip the reinforcing thread and can only grip the normal thread.

Those needles, on the other hand, that are raised to a greater extent by means of lifters 15 so that their hooks and heels travel along the paths indicated by broken lines 17 and 17a, respectively, can grip both the reinforcing thread and the normal thread.

The selection of the lifters 15 which are rendered operative to bring about this greater upward lift of the needles, takes place in the following manner.

Each lifter 15 is formed at its inner edge 19 which rests against the inner surface or bottom of the related slot 6 of drum 2, with an outwardly inclined plane 18 (see in particular FIG. 2) extending towards the lower end of the lifter. When in the normal inoperative position, the lifters rest with their inner edges 19 against the inner surfaces of slots 6 and are each brought to or kept in that inoperative position by a spring member 20 which acts radially inward against the outer part of the lifter, as is clearly shown on FIG. 2. In this inoperative position the lifter stands straight up and has its lower end spaced radially outward from the inner surface or bottom of the slot 6.

Each one of lifters 15 is formed with an upper heel 21 and a lower heel 22 which are directed outwardly therefrom.

The upper portions of the lifters inserted in the slots of drum 2 are surrounded by a ring 23 formed with a lifter cam 24 on its upper surface (FIG. 6) by which the upper heels 21 of the lifters are engageable in order to be lifted. Cam 24 is, however, at such a distance from the outer surface of drum 2 that it cannot act on the upper heels of the lifters if the latter are in their inoperative positions (FIG. 2). In order to bring heels 21 into engagement with cam 24, it is necessary to rock or tilt the lifters in such a manner that their inclined planes 18 rest against the inner surfaces or bottoms of their respective slots 6 (FIG. 3), in which case the upper ends and heels 21 of the lifters will jut out further from the surface of drum 2.

This rocking or tilting of lifters 15 can be obtained by means of a ring cam acting on the lower heels 22 of lifters 15 and partly surrounding the lower part of the drum at the height of said lower heels 22.

This ring cam, in the embodiment illustrated in FIGS. 1 to 7, consists of two concentric parts 25 and 26 which can be angularly shifted relative to each other as will be disclosed hereinafter, and rotates together with drum 2. Each of the parts 25, 26 is integral with a sector of an annular disc, which disc sectors are locked between the bottom end of drum 2 and gear 4 (FIG. 1). Cam parts 25 and 26 are at such a distance from the outer surface of drum 2 that lifters 15 having their heels 22 engaged by such cam parts, have their lower ends pushed radially inward towards the bottoms of inner surfaces of their slots 6, thus tilting into their operative positions (FIG. 3) where the upper ends of the lifters jut out further from the drum so that the fixed lifter cam 24 can act on heels 21.

At this point it should be noted that, in the embodiment of the invention under consideration, there are three different types of lifters 15 situated respectively in the sectors indicated by the letters A, B and C in FIG. 4 and FIG. 5. The lifters of sector A are formed without lower heels and have upper heels that project radially outward greater distances than the upper heels of the lifters in sectors B and C. These lifters, indicated by the symbol 15a in FIG. 4, are always operative, that is, are always engageable by the lifter cam 24, and cannot be rendered inoperative.

The number of lifters 15a corresponds to the number of slots of the drum in sector A which is, in turn, determined by the arcuate extent of cam parts 25 and 26 when the latter cover each other completely or are circumferentially coextensive (as in FIG. 5). Since lifters 15a are always operative, they determine the minimum width of reinforced knitted fabric in the part of the stocking or sock that it is desired to reinforce with the device embodying the invention.

It is clear that, in order to render inoperative the whole device, as during the knitting of normal, non-reinforced fabric, it is sufficient to take the supplementary thread guide 14 out of operation so as to prevent gripping of the reinforcing thread by the needles even though the corresponding lifters are operative.

The lifters that are indicated by the symbol 15b and are disposed in section B, have relatively short bottom heels and are engageable only by cam part 26 since the latter is nearer to the outer surface of drum 2. The lifters indicated by the symbol 15c, that are disposed in sector C, have relatively long bottom heels and are controlled by cam part 25 even though the latter is further away from drum 2 than the cam part 26. If cam parts 25 and 26 completely cover each other or are circumferentially coextensive as in FIG. 5, only the lifter 15a in sector A are operative. If, however, the two cam parts 25 and 26, are shifted angularly in the directions indicated by arrows 27 and 28 (FIG. 5), the number of active or operative lifters is correspondingly increased by the movement to their operative positions of more or less of the lifters 15b and 15c.

The angular movement of cam parts 25 and 26 is obtained in the following manner.

Figure 7:
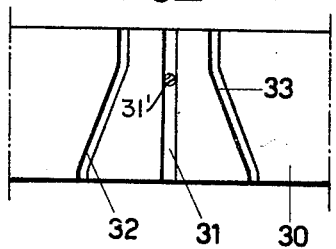
FIG. 7 is a diagrammatic view, developed in a flat plane, of the central control means of the device of FIG. 1.

Inside tube 3 there is disposed a tube 29 formed on its outside with a sleeve 30 the design of which is shown on FIG. 7. In the outer surface of sleeve 30, which is integral or fixed with tube 29, there is provided a longitudinal or axial groove 31 extending vertically in the knitting machine into which a connecting means, for example, a pin 31′ (FIG. 7) extending from tube 3 is inserted to rotatably couple sleeve 30 and tube 29 with rotating tube 3.

Sleeve 30 is formed with two additional contoured grooves 32 and 33 in each of which the inner end of a radial rod, like that indicated at 34 (FIG. 1), is slidably received. The rods 34 pass through tube 3 which is provided with appropriate slits for the purpose and the outer ends of rods 34 are rigidly secured to the disc sectors of cam parts 25 and 26, respectively. Tube 29 and sleeve 30 rotate with tube 3 and drum 2, but the connection permits tube 29 to shift axially in relation to tube 3.

Tube 29 is, in fact, rotatably supported at its lower end in a support 35 disposed at the end of an arm 36 which is free to swing on a pivot 37. Arm 36 rests on an eccentric 38 which is integral with a shaft 39 which also bears two saw-toothed wheels or ratchets 40 and 41 whose teeth are inclined in opposite directions. Two tong arms 42 and 43 are rockably mounted on a pivot 44 at one end of a bellcrank 45 which is in turn rockable about a pivot 46 fixed solidly to the machine frame. The tips of tong arms 42 and 43 are engageable with the two toothed wheels 40 and 41. The other end 47 of bellcrank 45 cooperates with a face cam 48 carried by a shaft 49 which also carries the gear 5. Shaft 49 makes one revolution for every revolution of drum 2, and face cam 48, formed with a protuberance 50, thus imparts an oscillating impulse to bellcrank 45 for each revolution of drum 2.

To the free ends of tong arms 42 and 43 there are connected upwardly directed rods 51 and 52, respectively, having their upper ends pressed against annular cams 55 and 56, respectively, mounted on the main drive drum 57 of the machine, by means of springs 53 and 54 connected to arms 42 and 43.

When rods 51 and 52 engage low portions of cams 55 and 56, the tip of tong arm 42 engages ratchet 40 while the tip of arm 43 is spaced from ratchet 41, so that the rocking of bellcrank 45 by cam 48 causes turning of eccentric 38 in one direction through a predetermined angle during each rocking impulse imparted to the bellcrank. When rods 51 and 52 engage high portions of their cams 55 and 56, tong arm 42 disengages ratchet 40 and tong arm 43 engages ratchet 41 to turn eccentric 38 in the opposite direction upon rocking of bellcrank 45. Of course, when rods 51 and 52 engage high and low portions, respectively, of cams 55 and 56, both tong arms 42 and 43 are held out of engagement with ratchets 40 and 41. Consequently arm 36 carrying tube 29 is raised or lowered, or held at rest, and the rods, such as 34, which are engaged in grooves 32 and 33 of sleeve 30 and which cannot be raised or lowered, are angularly displaced and similarly displace the cam parts 25 and 26, thus increasing or diminishing the number of operative lifters 15, as described above.

Thus by raising or lowering internal tube 29, the number of operative lifters 15 can be varied and hence also the number of needles that can grip the supplementary or reinforcing thread in addition to the normal thread.

The lifters that are acted upon by cam parts 25 and 26 and brought into the operative position shown in FIG. 3 can be lifted by the fixed lifter cam 24 which, as already stated, acts only on the upper heels 21 of the lifters 15 that are resting with their inclined planes 18 against the inner surfaces or bottoms of their respective slots 6.

If the machine has seevral feeds, the device described hereinabove remains unchanged except that, for every feed there is provided a fixed lifter cam (like that shown at 24) and a thread guide for the reinforcing thread (like that shown at 14). The needles in each feed which have to take the reinforcing thread in addition to the normal thread, are selected by the same cam parts 25 and 26 acting on the related lifters 15 and being controlled by the internal tube 29.

Figure 8:
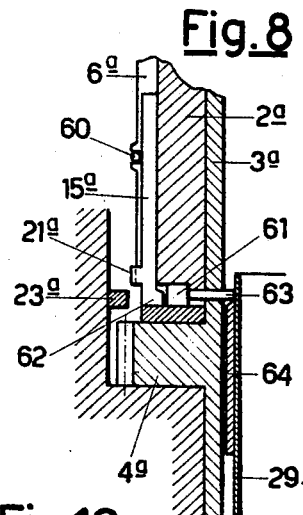
FIGS. 8 and 9 are fragmentary sectional views similar to FIGS. 2 and 3, but showing a lifter in its inoperative and operative positions, respectively, in a device according to another embodiment of the invention.
Figure 9:
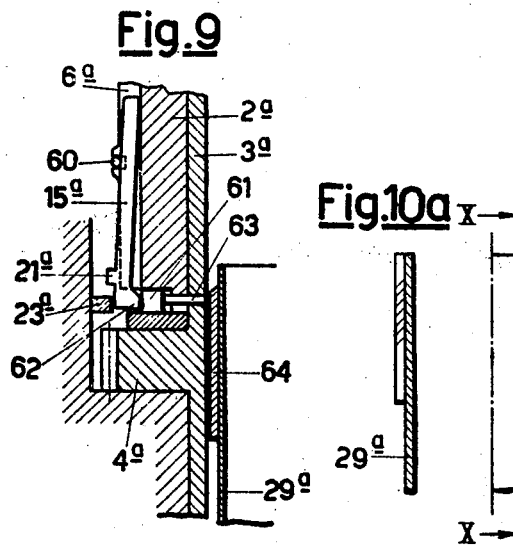
Figures 10, 10A:
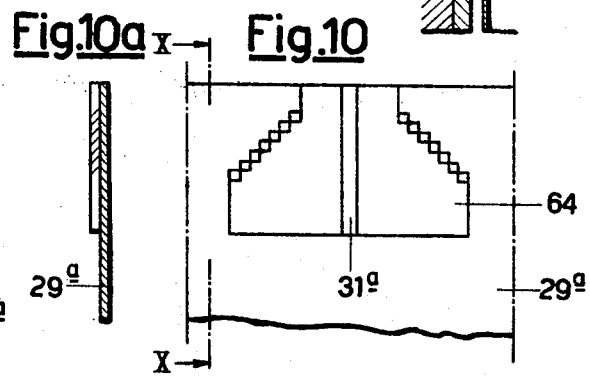
FIG. 10 is a diagrammatic view, developed in a flat plane, of the central control means for selecting those lifters to be moved to their operative positions in the device of FIGS. 8 and 9.
FIG. 10a is a sectional view along the line X—X on FIG. 10.

A second embodiment of the device according to the invention is illustrated in FIGS. 8 to 10. This embodiment works in principle in exactly the same manner as that described hereinabove. Here too, lifters 15a are provided for a certain number of needles, and can take up two positions in slots 6a, namely an inoperative position (see FIG. 8), and an operative position (see FIG. 9). In the inoperative position, the lifter is completely disposed in its slot 6a and the heel 21a, which in this case is near the lower end of the lifter, cannot be engaged by a fixed lifter cam (not shown) on ring 23a. In the operative position, the lower part of the lifter juts out from groove 6a and heel 21a can be engaged by this lifter cam. The lifters 15a are surrounded by a spring 60, and can be rocked or tilted about their upper ends so as to be brought from the inoperative position into the operative position by means of devices rotating together with the drum and acting so as to push the lower ends of the lifters radially out of their slots 6a.

Such devices are in the form of blocks 61 which can be shifted radially in an annular seat at the lower end of drum 2a. Each block 61 may have its width dimensioned so that it can act simultaneously on a plurality of lifters, or on a single lifter 15a. Each lifter is formed with an inwardly directed heel 62 against which the related block 61 acts. Each block 61 has a pin 63 extending radially inward therefrom through an appropriate slit in tube 3a. The radial movements of blocks 61 are controlled by a sleeve 64, carried by internal tube 29a, and with which pins 63 cooperate.

This sleeve 64 is integral with tube 29a and is provided with a vertically directed longitudinal groove 31a engageable by a pin or the like (not shown) extending from tube 3a so that tube 29a and sleeve 64 rotate with tube 3a but can shift axially in relation thereto.

The pins 63 of blocks 61 which rest against sleeve 64, push out their respective lifters 15a, whereas the pins 63 which rest on the outer surface of drum 29a leave their respective lifters in the inoperative position.

As may be seen in FIG. 10, the upper profile of sleeve 64 is formed with steps that are symmetrical about the vertically directed central longitudinal line. By shifting tube 29a with sleeve 64 in a longitudinal direction, it is possible to outwardly displace a greater or lesser number of blocks 61 for the rocking of their respective lifters to the operative positions thereof.

The steps of sleeve 64 are sloping (FIG. 10a) so as to facilitate the passage of pins 63 from the surface of tube 29a to that of the sleeve. The axial shifting of tube 29a can be obtained by means of the same arrangement described for the first embodiment of the device.

In both cases, the shape of the reinforced part of the stocking will be determined by the manner in which tube 29a with its control sleeve is axially shifted in order to activate or de-activate the lifters and thus select the needles that are to grip the supplementary or reinforcing thread.

Figure 11:
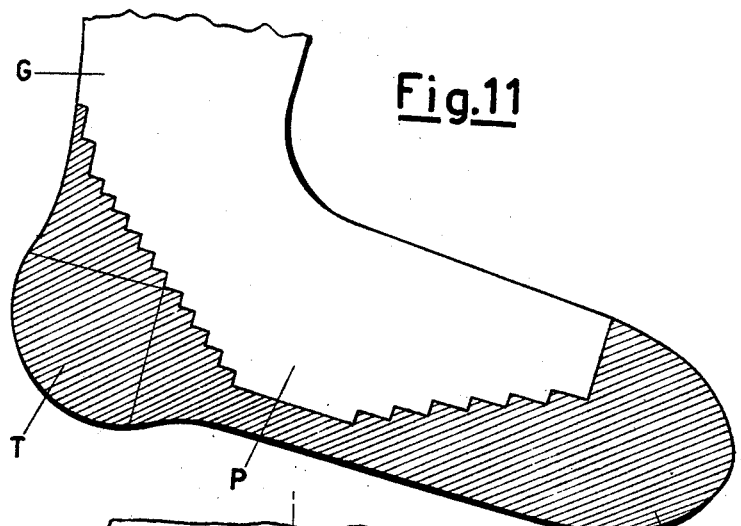
FIG. 11 is a diagrammatic side elevational view of the foot portion of a stocking having a reinforced part of a shape that can be obtained with the devices embodying this invention.

As an example, FIG. 11 shows diagrammatically the lower part of a stocking having the leg G, the heel T, the foot P and the toe S.

Figure 12:
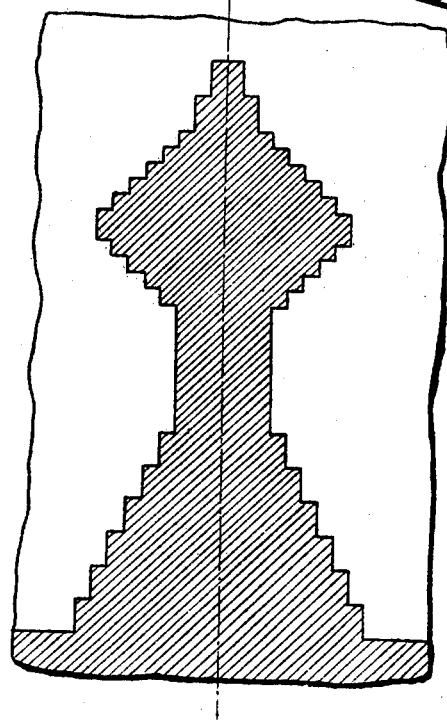
FIG. 12 is a diagrammatic view, developed in a flat plane, of the reinforced part of the stocking shown on FIG. 11.

The hatched part indicates the reinforced knitted fabric formed with the reinforcing thread as well as the normal thread, and the plan of said reinforced part is shown in FIG. 12.

The advantages of the device according to the invention are manifest. It enables the selection of certain needles, which are to be raised to a greater extent than normal, to be made by extremely simple, centrally arranged control means, and in addition, the circular knitting machine may be provided with a plurality of feeds without complication of the device by which those needles are selected.

Although illustrative embodiments of the invention have been described in detail herein with reference to the accompanying drawings, it is to be understood that the invention is not limited to those precise embodiments, and that various changes and modifications may be made therein by one skilled in the art without departing from the scope or spirit of the invention, except as defined in the appended claims.

I claim:

1. In a circular knitting machine for the production of stockings or socks and having a rotatable cylinder with axial slots in which needles are slidable for gripping a normal thread fed to the needles by a normal thread guide at a feed of the knitting machine; a device for forming shaped reinforced parts of the stockings or socks, said device comprising a supplementary thread guide at said feed placed at a higher level than said normal thread guide for feeding a reinforcing thread, lifters disposed in said slots of the cylinder below at least certain of said needles and being selectively movable between inoperative and operative positions, a non-rotatable cam engageable by those lifters in the operative positions of the latter and effecting upward movement of the engaged lifters to an extent causing lifting of the corresponding needles sufficiently to grip the reinforcing thread, as well as the normal thread, at said feed, control means for selectively moving said lifters from said inoperative positions to said operative positions, said control means being rotatable with said needle cylinder, and actuating means located within said cylinder for actuating said control means.

2. In a circular knitting machine, a device for forming shaped reinforced parts as in claim 1; wherein said actuating means includes a tubular member mounted inside said needle cylinder and being axially movable relative to the latter, and said control means varies the number of said lifters moved to their operative positions in accordance with changes in the axial position of said tubular member relative to said needle cylinder.

3. In a circular knitting machine, a device for forming shaped reinforced parts as in claim 2; wherein said control means is angularly displaceable relative to said cylinder about the axis of the latter for varying the number of said lifters moved to said operative positions, and said control means and tubular member have cooperatively engaging means for effecting angular displacement of said control means in response to axial displacement of said tubular member relative to said cylinder.

4. In a circular knitting machine, a device for forming shaped reinforcing parts as in claim 3; wherein said control means includes an arcuate cam arranged outside of said needle cylinder and adapted to act on the lower end portions of the lifters for moving the latter to their operative positions, and said cooperatively engaging means for effecting angular displacement of the control means includes means on said tubular member defining shaped grooves, and radial rods extending from said cam and slidably engaging in said grooves.

5. In a circular knitting machine, a device for forming shaped reinforcing parts as in claim 4; wherein said lifters have inner edges with inclined lower portions and outwardly directed heels extending from the lower ends of the lifters and engageable by said arcuate cam to rock the lifters to said operative positions in which said inclined lower portions of the inner edges are against the inner surfaces of the respective slots of said cylinder.

6. In a circular knitting machine, a device for forming shaped reinforcing parts as in claim 4; wherein said arcuate cam includes two concentric parts at different radial distances from said cylinder and angularly movable relative to each other to cover a partial peripheral zone of said needle cylinder, which zone is variable in its angular extent from a minimum, when said two cam parts are circumferentially superimposed, to a maximum, when said two cam parts are in circumferential end-to-end relation.

7. In a circular knitting machine, a device for forming shaped reinforcing parts as in claim 6; wherein said lifters are divided into three circumferentially successive sets, the central set of said lifters corresponding to said minimum angular extent of said peripheral zone covered by the cam parts and being always in said operative positions thereof to define the minimum width of the reinforced part, and the lifters of the two other sets have outwardly directed heels of different lengths extending from their lower ends and respectively engageable by said cam parts at different distances from the cylinder when said cam parts are angularly moved relative to each other from their circumferentially superimposed positions.

8. In a circular knitting machine, a device for forming shaped reinforced parts as in claim 7; wherein said means on the tubular member defining the shapes grooves includes a sleeve fixed on said tubular member and having an axially extending groove about which said shaped grooves are symmetrically arranged, and said radial rods extend from said two cam parts and respectively engage said shaped grooves at opposite sides of said axial groove; and wherein said axial groove slidably receives means fixed relative to said cylinder to constrain said tubular member to rotate with the cylinder.

9. In a circular knitting machine, a device for forming shaped reinforcing parts as in claim 2; wherein said tubular member has a radially raised portion on its outer surface, and said control means engages said outer surface of the tubular member and moves said lifters to their operative positions upon contact with said radially raised portion.

10. In a circular knitting machine, a device for forming shaped reinforced parts as in claim 9; wherein said radially raised portion has shaped edges in the form of steps.

11. In a circular knitting machine, a device for forming shaped reinforced parts as in claim 9; wherein said cylinder has an annular seat at the inside of the lower ends of said lifters, and said control means includes blocks radially guided in said annular seat and having rods projecting radially inward to engage said outer surface of the tubular member so that, upon contact of said rods with said raised portion, the related blocks are displaced radially outward to move the corresponding lifters to their operative positions.

12. In a circular knitting machine, a device for forming shaped reinforced parts as in claim 11; wherein each of said blocks is engageable with a plurality of said lifters.

13. In a circular knitting machine, a device for forming shaped reinforced parts as in claim 2; further comprising a pivotally mounted arm supporting said tubular member at the lower end of the latter, and an eccentric engaged by said arm and being turnable for effecting the axial movements of said tubular member.

14. In a circular knitting machine, a device for forming shaped reinforced parts as in claim 13; wherein the knitting machine has a main drive drum; and said device further comprises two ratchet wheels rotatably coupled with said eccentric and having oppositely directed peripheral teeth, two tong arms respectively engageable with the teeth of said two ratchet wheels, cams on said main drive drum of the knitting machine controlling the engagement and disengagement of said tong arms with the respective ratchet wheels, and means causing reciprocatory movement of said tong arms during each revolution of said needle cylinder so that, when one of said tong arms is engaged with the respective ratchet wheel, said eccentric is turned in a step-by-step manner in a corresponding direction.

15. In a circular knitting machine, a device for forming shaped reinforced parts as in claim 14; wherein said means for causing reciprocatory movement of the tong arms includes a rockable bellcrank on which said tong arms are pivotally mounted, and a face cam rotating in synchronism with the needle cylinder and engaging said bellcrank to rock the latter upon rotation of said needle cylinder.

References Cited by the Examiner

UNITED STATES PATENTS

| | | | |
|---|---|---|---|
| 597,794 | 1/98 | Wilcomb | 66—136 X |
| 1,594,421 | 8/26 | Mankin | 66—133 X |
| 1,797,006 | 3/31 | Lombardi | 66—50 |
| 1,927,683 | 9/33 | Grothey | 66—136 X |

FOREIGN PATENTS

| | | |
|---|---|---|
| 558,651 | 7/57 | Belgium. |

RUSSELL C. MADER, *Primary Examiner.*